US011259285B2

(12) United States Patent
Gidvani et al.

(10) Patent No.: US 11,259,285 B2
(45) Date of Patent: Feb. 22, 2022

(54) CO-LOCATED BASIC SERVICE SETS

(71) Applicant: QUALCOMM Incorporated, San Diego, CA (US)

(72) Inventors: Ravi Gidvani, Fremont, CA (US); Abhishek Pramod Patil, San Diego, CA (US); Alfred Asterjadhi, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/247,538

(22) Filed: Jan. 14, 2019

(65) Prior Publication Data
US 2019/0268892 A1 Aug. 29, 2019

Related U.S. Application Data

(60) Provisional application No. 62/636,156, filed on Feb. 27, 2018.

(51) Int. Cl.
*H04W 72/04* (2009.01)
*H04W 76/11* (2018.01)
(Continued)

(52) U.S. Cl.
CPC ...... *H04W 72/0406* (2013.01); *H04B 7/0413* (2013.01); *H04W 48/16* (2013.01);
(Continued)

(58) Field of Classification Search
CPC .......................... H04B 7/0413; H04W 48/16; H04W 72/0406; H04W 74/006; H04W 76/11;
(Continued)

(56) References Cited

U.S. PATENT DOCUMENTS 7,379,435 B1 * 5/2008 Kinder .............. H04W 52/0216
370/324
7,889,663 B1 * 2/2011 Wright .................. H04W 24/06
370/241

(Continued)

FOREIGN PATENT DOCUMENTS

WO  WO-2015195047 A1  12/2015
WO    2018132286      7/2018

OTHER PUBLICATIONS

"PCT Application No. PCT/US2019/014479 International Search Report and Written Opinion", dated Apr. 12, 2019, 16 pages.
(Continued)

*Primary Examiner* — Shah M Rahman
(74) *Attorney, Agent, or Firm* — DeLizio Law, PLLC; Kevin M. Donnelly

(57) ABSTRACT

This disclosure provides systems, methods, and apparatus, including computer programs encoded on computer-readable media, for co-located Basic Service Sets (BSSs). A BSS refers to an access point (AP), wireless channel configuration, and associated stations (STAs). In one aspect, a wireless local area network (WLAN) apparatus may operate multiple virtual access points (VAPs) and multiple BSSs. The BSS may be considered co-located if they are implemented in the same physical device (such as a WLAN apparatus). Furthermore, the BSSs may be considered co-hosted if they share the same band and wireless channel, but independently signal different management frames. To aid STAs in learning about the co-located or co-hosted BSSs, the present disclosure provides techniques to advertise the co-located or co-hosted BSSs. Further improvements for co-hosted BSSs include the use of control frames that can aggregate information for more than one co-hosted BSS sharing a same wireless channel.

8 Claims, 9 Drawing Sheets

(51) Int. Cl.
   *H04W 48/16* (2009.01)
   *H04B 7/0413* (2017.01)
   *H04W 74/00* (2009.01)
   *H04W 84/12* (2009.01)
(52) U.S. Cl.
   CPC .......... *H04W 74/006* (2013.01); *H04W 76/11* (2018.02); *H04W 84/12* (2013.01)
(58) Field of Classification Search
   CPC .. H04W 84/12; H04W 48/08; H04W 72/0493
   See application file for complete search history.

(56) References Cited

U.S. PATENT DOCUMENTS

| | | | | |
|---|---|---|---|---|
| 10,237,891 | B1* | 3/2019 | Chu | H04W 48/16 |
| 10,524,290 | B1* | 12/2019 | Chu | H04W 74/0816 |
| 10,588,165 | B1* | 3/2020 | Chu | H04W 74/0816 |
| 2007/0195727 | A1* | 8/2007 | Kinder | H04L 41/00 370/328 |
| 2010/0020746 | A1 | 1/2010 | Zaks | |
| 2011/0292925 | A1 | 12/2011 | Ho et al. | |
| 2014/0146678 | A1* | 5/2014 | Merlin | H04L 47/12 370/235 |
| 2014/0254555 | A1* | 9/2014 | Reznik | H04W 16/10 370/331 |
| 2014/0328193 | A1* | 11/2014 | Horn | H04W 24/10 370/252 |
| 2015/0124774 | A1 | 5/2015 | Kaushik et al. | |
| 2015/0365805 | A1* | 12/2015 | Bajko | G01S 13/767 455/456.1 |
| 2016/0007247 | A1* | 1/2016 | Lee | H04W 36/0072 370/331 |
| 2016/0081124 | A1* | 3/2016 | Yang | H04W 72/1205 370/329 |
| 2016/0219504 | A1* | 7/2016 | Cho | H04W 48/16 |
| 2016/0374078 | A1* | 12/2016 | Ghosh | H04W 16/10 |
| 2018/0042058 | A1* | 2/2018 | McCann | H04W 48/16 |
| 2018/0083685 | A1* | 3/2018 | Patwardhan | H04B 7/0626 |
| 2018/0184401 | A1* | 6/2018 | Ghosh | H04W 72/04 |
| 2018/0302783 | A1* | 10/2018 | Mestanov | H04W 8/22 |
| 2019/0124706 | A1* | 4/2019 | Huang | H04W 72/0446 |
| 2019/0174577 | A1 | 6/2019 | Patil et al. | |
| 2020/0280909 | A1* | 9/2020 | Gan | H04W 48/10 |
| 2021/0014914 | A1* | 1/2021 | Huang | H04W 8/26 |
| 2021/0168856 | A1* | 6/2021 | Cariou | H04W 88/06 |
| 2021/0204204 | A1* | 7/2021 | Kim | H04W 52/0216 |

OTHER PUBLICATIONS

Chu, et al., "Multiple BSSID and MU Discussion", vol. 802.11ax, Nov. 8, 2016, 10 pages.
IEEE Computer Society, "Part 11: Wireless LAN Medium Access Control (MAC) and Physical Layer (PHY) Specifications", Dec. 7, 2016, 100 pages.
Patil, et al., "Resolution for CID 11742", vol. 802.11ax, No. 1, Jan. 12, 2018, 9 pages.
U.S. Appl. No. 16/182,345, filed Nov. 6, 2018.
U.S. Appl. No. 16/203,604, filed Nov. 28, 2018.

* cited by examiner

700

710 — OPERATE, AT THE WLAN APPARATUS, MULTIPLE VIRTUAL ACCESS POINTS (VAPS) ASSOCIATED WITH CORRESPONDING CO-LOCATED BASIS SERVICE SETS (BSSS), THE MULTIPLE VAPS INCLUDING AT LEAST A FIRST VAP FOR A FIRST BSS AND A SECOND VAP FOR A SECOND BSS, WHEREIN THE FIRST VAP AND THE SECOND VAP UTILIZE DIFFERENT MANAGEMENT FRAMES

770 — OUTPUT, VIA THE FIRST BSS, A FIRST MANAGEMENT FRAME THAT INCLUDES AN IDENTIFICATION OF THE SECOND BSS

810 — RECEIVE, FROM A FIRST VIRTUAL ACCESS POINT (VAP) ASSOCIATED WITH A FIRST BASIC SERVICE SET (BSS), A FIRST MANAGEMENT FRAME THAT INCLUDES AN IDENTIFICATION OF A SECOND BSS

820 — DETERMINE THAT THE WLAN APPARATUS IS OPERATING MULTIPLE VAPS ASSOCIATED WITH CORRESPONDING CO-LOCATED BSSS, THE MULTIPLE VAPS INCLUDING AT LEAST THE FIRST VAP ASSOCIATED WITH THE FIRST BSS AND A SECOND VAP ASSOCIATED WITH A SECOND BSS, WHEREIN THE FIRST VAP AND THE SECOND VAP UTILIZE DIFFERENT MANAGEMENT FRAMES

*FIGURE 8*

CO-LOCATED BASIC SERVICE SETS

CROSS-REFERENCE TO RELATED APPLICATIONS

This patent application claims priority to U.S. Provisional Patent Application No. 62/636,156 filed Feb. 27, 2018 and entitled "CO-LOCATED BASIC SERVICE SETS," and assigned to the assignee hereof. The disclosure of the prior application is considered part of and is incorporated by reference in this patent application.

TECHNICAL FIELD

This disclosure relates to the field of network communication, and more particularly to wireless local area networks.

DESCRIPTION OF THE RELATED TECHNOLOGY

An access point (AP) of a wireless local area network (WLAN) can enable wireless network access for a client device (also referred to as a station, or STA). The AP may provide a wireless coverage area used by one or more STAs. A Basic Service Set (BSS) may be defined as one AP, the wireless channel configuration, and the set of STAs that are wirelessly associated with the AP. The wireless channel configuration may utilize a portion of a frequency band (such as a 2.4 GHz frequency band, a 5 GHz frequency band, etc.). Within each frequency band, there may be different channels which an AP may utilize as part of the wireless channel configuration. Furthermore, the AP may utilize more than one antenna. For example, an AP may utilize multiple-input-multiple-output (MIMO) communication in which multiple antennas transmit wireless signals.

Multiple APs may be used within the same geographical area to support larger quantities of STAs or to separate traffic among groups of STAs. In the past, a single WLAN apparatus may have operated only one AP. Recently, a single WLAN apparatus may be configured to operate multiple virtual APs (for multiple BSSs) from the same WLAN apparatus. Each virtual AP may be associated with a different BSS identifier (BSSID).

SUMMARY

The systems, methods, and devices of this disclosure each have several innovative aspects, no single one of which is solely responsible for the desirable attributes disclosed herein.

One innovative aspect of the subject matter described in this disclosure can be implemented as a method performed by a wireless local area network (WLAN) apparatus for wireless communication. The method may include operating, at the WLAN apparatus, multiple virtual access points (VAPs) associated with corresponding co-located basis service sets (BSSs). The multiple VAPs may include at least a first VAP for a first BSS and a second VAP for a second BSS. The first VAP and the second VAP may utilize different management frames. The WLAN apparatus may output, for transmission via the first BSS, a first management frame that includes an identification of the second BSS.

In some implementations, the WLAN apparatus may advertise the second BSS as a co-located BSS to cause a client station (STA) to refrain from transmitting while the second BSS is in use.

In some implementations, the first BSS and the second BSS share a same operating class, channel, and one or more antennas of the WLAN apparatus such that the first BSS and the second BSS are co-hosted BSSs in a Co-Hosted BSS Set.

In some implementations, the WLAN apparatus may output a control frame from the first BSS. The control frame may include control information for the second BSS.

In some implementations, the control frame may include a trigger frame and the control information may be for a station (STA) associated with the second BSS.

In some implementations, the first management frame may include an identifier or address of a master BSS in the Co-Hosted BSS Set.

In some implementations, the first management frame may include an indication that the first BSS supports the co-hosted BSS control frame aggregation feature.

In some implementations, the first management frame may include an indicator that the second BSS is a co-located or co-hosted BSS.

In some implementations, the first management frame may be one of a beacon frame and a probe response.

In some implementations, the identification of the second BSS may include discovery information regarding the second BSS in a neighbor report in the first management frame. The neighbor report may include at least one bit indicating that the second BSS is a co-located or co-hosted BSS.

In some implementations, the discovery information may include at least one member selected from a group consisting of a BSS identifier (BSSID), Service Set identifier (SSID), operating class, band, channel, an indicator whether the second BSS has periodic discovery frames, and an indicator whether the second BSS belongs to a Multiple BSSID Set.

In some implementations, the neighbor report may include a Neighbor Report element or a Reduced Neighbor Report element.

In some implementations, the identification of the second BSS includes a BSS identifier (BSSID) of the second BSS in a high efficiency (HE) Operation element in the first management frame. The HE Operation element may include at least one bit indicating that the second BSS is a co-located or co-hosted BSS.

In some implementations, the first BSS is associated with a first BSS identifier (BSSID) and the second BSS is associated with a second BSSID.

In some implementations, the second BSSID and the first BSSID are not contiguous.

In some implementations, the WLAN apparatus may provide, in a first portion of the first management frame, identifications for a first subset of the co-located BSSs. The WLAN apparatus may provide, in a second portion of the first management frame, identifications for a second subset of the co-located BSSs.

In some implementations, the first portion of the first management frame may include a first field to indicate the first subset of the co-located BSSs. The first subset may include those BSSs having contiguous BSS identifiers (BSSIDs). The second portion of the first management frame may include a second field to indicate the second subset of the co-located BSSs. The second subset may include those BSSs having non-contiguous BSSIDs.

In some implementations, the first management frame may include identifications for multiple BSSs that are co-located BSSs at the WLAN apparatus. The first management frame may include an indicator that indicates whether the identifications for the multiple BSSs include all the co-located BSSs at the WLAN apparatus or a subset of the co-located BSSs at the WLAN apparatus.

Another innovative aspect of the subject matter described in this disclosure can be implemented as a method performed by a STA for communicating with a WLAN apparatus. The STA may receive, from a first VAP associated with a first basic service set (BSS), a first management frame that includes an identification of a second BSS. The STA may determine that the WLAN apparatus is operating multiple VAPs associated with corresponding co-located BSSs. The multiple VAPs may include at least the first VAP managing the first BSS and a second VAP managing a second BSS. The first VAP and the second VAP may utilize different management frames.

In some implementations, the STA may determine that the second BSS is a co-located BSS to the first BSS based, at least in part, on the first management frame.

In some implementations, the first BSS and the second BSS may share a same operating class, channel, and one or more antennas of the WLAN apparatus such that the first BSS and the second BSS are co-hosted BSSs in a Co-Hosted BSS Set.

In some implementations, the STA may establish a wireless association with the second VAP and joining the second BSS. The STA may determine that the first BSS is a master BSS for the Co-Hosted BSS Set. The STA may, while maintaining the wireless association with the second VAP, receive a control frame from the first VAP corresponding to the first BSS. The control frame may include control information for the STA.

In some implementations, the control frame may include a trigger frame. The STA may communicate with the second VAP in response to the trigger frame from the first VAP.

In some implementations, the STA may determine that the first BSS is the master BSS by receiving, from the first VAP, an identifier or address of the second BSS that identifies the second BSS as the master BSS in the Co-Hosted BSS Set.

In some implementations, the STA may output a second management frame from the STA to the second VAP to indicate that the STA supports the co-hosted BSS control frame aggregation feature.

Another innovative aspect of the subject matter described in this disclosure can be implemented as a computer-readable medium having stored therein instructions. The instructions, when executed by a processor, may cause the processor to perform any one of the above-mentioned methods.

Another innovative aspect of the subject matter described in this disclosure can be implemented as an apparatus having an interface and a processor. The processor may cause the apparatus to perform any one of the above-mentioned methods.

Another innovative aspect of the subject matter described in this disclosure can be implemented as a system having means for implementing any one of the above-mentioned methods Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 7 depicts a flowchart with an example process for signaling identifiers for co-located or co-hosted BSSs.

FIG. 8 depicts a flowchart with an example process for a STA receiving a management frame that includes identifiers for co-located or co-hosted BSSs.

Like reference numbers and designations in the various drawings indicate like elements.

DETAILED DESCRIPTION

Figure 1:
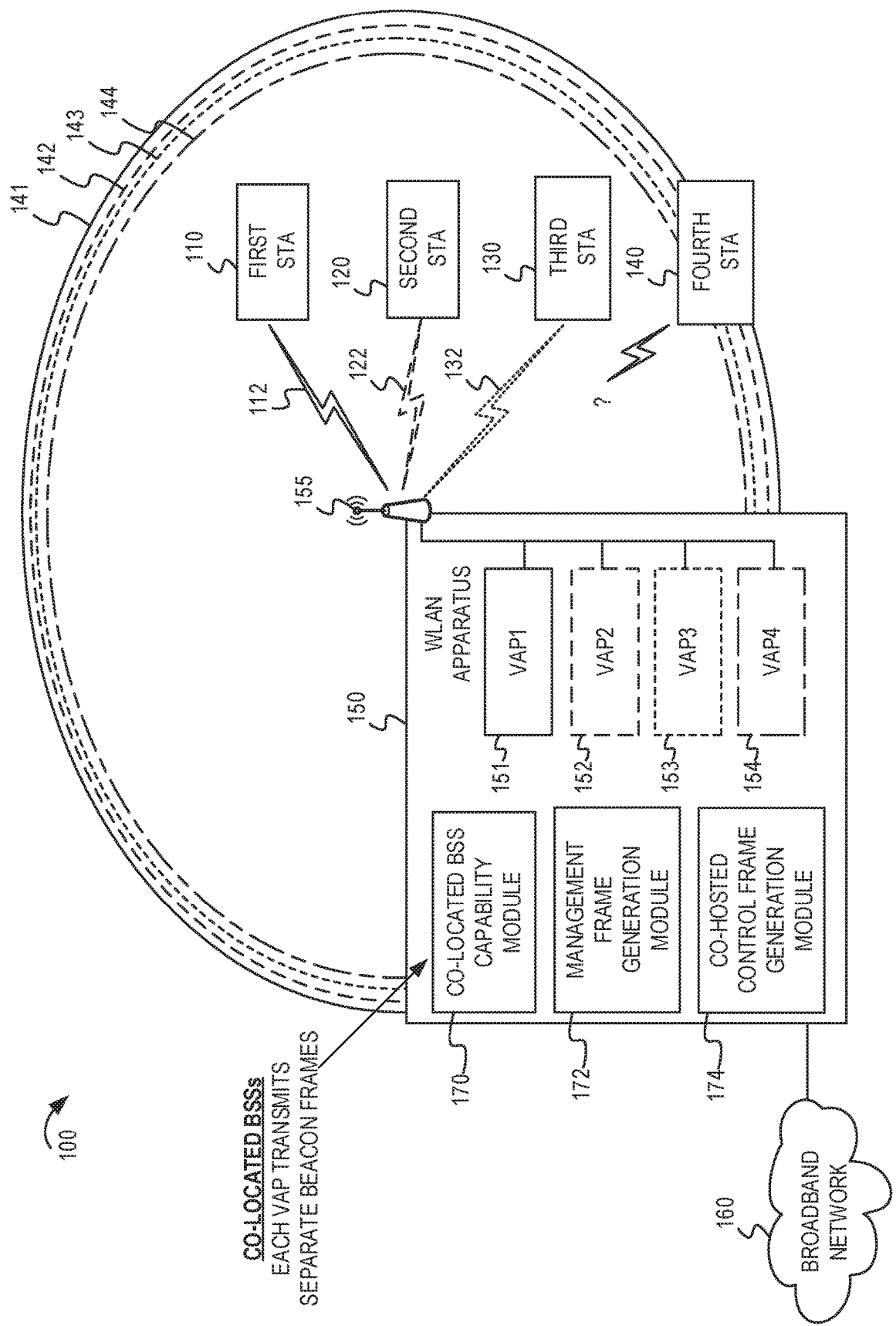
FIG. 1 depicts a system diagram of an example wireless local area network (WLAN) apparatus operating co-located basic service sets (BSSs).

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G standards, among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal frequency division multiple access (OFDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Stations (STAs) in the network can establish a wireless association (also referred to as a wireless link, wireless connection, or the like) with an access point (AP). The AP may provide facilitate communication between different associated STAs as well as provide access to one or more external networks including broadband networks. The AP, the wireless channel configuration, and the set of STAs that are wirelessly associated with the AP are referred to as a Basic Service Set (BSS). In this disclosure a WLAN apparatus may be configured to operate multiple virtual APs (VAPs) for implementing multiple respective BSSs from the same WLAN apparatus. Each VAP may be associated with a different BSS identifier (BSSID). Each VAP may transmit separate management frames (such as Beacon frames or Probe Response frames) to provide information about the BSS to any STAs in the vicinity of the AP. For example, the management frames may indicate the BSSID of the BSS and information regarding the respective BSS wireless channel configuration.

When a WLAN apparatus (for example, an access point device) operates multiple VAPs (corresponding to multiple BSSs), the BSSs may be referred to as "co-located" BSSs. In some implementations, co-located BSSs (used interchangeably with co-located VAPs) may be broadly defined to include all of the BSSs or VAPs that are operated by the same physical device (such as the WLAN apparatus), whether the VAPs use the same or different channels and bands (such as the 2.4 GHz band, the 5 GHz band, or the 6 GHz band), and whether the VAPs use the same or different antenna connectors. Co-located BSSs can operate at a WLAN apparatus as distinct BSSs with separate management frames. As another example, co-located BSSs can operate at a WLAN apparatus as distinct BSSs but using shared, common management frames.

For example, a WLAN apparatus that operates a first VAP associated with a first BSS in a first channel of the 5 GHz band, and a second VAP associated with a second BSS in a second channel of the 6 GHz band may be considered to have "co-located" VAPs and the corresponding BSSs. Also, the first VAP may use a first antenna connector (such as an antenna connector for a 5 GHz band) and the second VAP may use a second antenna connector (such as an antenna connector the 6 GHz band). In some implementations, a "co-hosted" VAP may be defined as a type of a co-located VAP, in that "co-hosted" VAPs are VAPs that operate in the same WLAN apparatus and that may operate on the same frequency channel and band. Co-hosted VAPs also may share the same antenna connector. For example, a WLAN apparatus that operates a first VAP (managing a first BSS) and a second VAP (managing a second BSS) in the same channel of the same band may be considered to have "co-hosted" VAPs and the co-hosted BSSs. In some implementations, a set of VAPs operating on the same WLAN apparatus (whether the VAPs use the same or different channels and bands and whether the VAPs use the same or different antenna connectors) also may be referred to as a Co-Located BSS Set. Furthermore, a set of VAPs operating on the same WLAN apparatus that use a common band, channel, and operating class may be referred to as a Co-Hosted BSS Set. It is noted, however, that in some implementations, "co-located" and "co-hosted" may be used interchangeably and may be broadly defined to include all of the VAPs that are served by the same WLAN apparatus, whether the VAPs use the same or different bands and channels, and whether the VAPs use the same or different antenna connectors.

Multiple BSSID capability (as defined by IEEE 802.11 DRAFT standards, such as 802.11ax) may refer to a capability of a WLAN apparatus to advertise information associated with multiple BSSIDs for multiple co-located BSSs using a single management frame (such as a Beacon Frame or Probe Response Frame), instead of using multiple Beacon or Probe Response Frames, each corresponding to a single respective BSSID. Together, the multiple BSSIDs that are included in the single management frame signaling may be referred to as a Multiple BSSID Set. For example, one VAP (for a first BSS) may send a Beacon Frame that includes the BSSIDs and configuration information about the other co-located BSSs in the Multiple BSS set operated by the WLAN apparatus. In some implementations, a first VAP (for a first BSS) may be designated as a primary source for management frames that include management information regarding multiple BSSs, including one or more other co-located BSSs in operation at the WLAN apparatus that are part of the Multiple BSSID Set. The BSSID of the first VAP (which is a source of management frames for the Multiple BSSID Set) may be referred to as the "transmitted BSSID" (or TxBSSID). The BSSID of another VAP belonging to a Multiple BSSID Set may be referred to as a "nontransmitted BSSID" (or NonTxBSSID) if that VAP's BSSID is advertised in a management frame of a transmitted BSSID.

As stated above, a distinction between multiple BSSID capability and other types of co-located BSSs is that multiple BSSID capability requires an aggregated beacon frame for a Multiple BSSID set while other co-located BSSs (not in a Multiple BSSID Set) use separate beacon frames to advertise their BSS configurations. There may be various reasons that co-located BSSs are not part of a Multiple BSSID Set. For example, the Multiple BSSID capability may not be supported by legacy devices. Furthermore, there may be implementations in which it is undesirable to combine information about Multiple BSSIDs in a single management frame. For example, a WLAN appliance may be commissioned to deploy wireless coverage for several different providers. Each provider may desire a separate BSS configuration that is advertised in separate management frames for its respective BSS.

Various implementations of this disclosure relate generally to improvements to co-located or co-hosted BSSs. Some implementations more specifically relate to the use of management frames to provide some information regarding co-located or co-hosted BSSs. Absent the techniques in this disclosure, the STAs that are associated to one of the BSSs may not know what other BSSs are co-located or co-hosted at the same WLAN apparatus. As described above, co-hosted BSSs may share a same operating class, BSS color, channel, and one or more antennas. Thus, wireless transmissions for the co-hosted BSSs may appear similar to a STA, except for the BSSID and other BSS parameters (such as security, SSID, etc.). By informing the STA regarding the co-hosted BSSs, the operation of the WLAN may be improved.

In some implementations, the STA may update its receiver and transmitter settings to avoid or monitor colliding or overlapping transmissions for a co-hosted BSS. In some implementations, the STA may enter a power save (PS) mode after detecting a transmission from a co-located or co-hosted BSS. Additionally, or alternatively, the STA may decide not to perform spatial reuse (SR) for a transmission from the co-located or co-hosted BSSs. In some implementations, the STA may update network allocation vector (NAV) settings if the STA is aware of co-hosted BSSs. The NAV setting is used by the STA's transmitter to avoid transmissions during time periods that are allocated to other BSSs (including the co-located BSSs). The PS and NAV settings may be used by the STA to sleep during periods when the co-hosted BSS is using the wireless communication medium.

In some implementations, the STA may refrain from filtering frames from co-hosted BSSs. For example, the frames for the co-hosted BSS may be considered when determining whether a BSS color collision has occurred. In some implementations, all co-hosted BSSs at a WLAN apparatus may use the same BSS color. BSS color refers to a numeric value assigned to a BSS. The BSS color may help a receiving STA quickly determine whether a frame is a transmission in the BSS the STA is using. If the BSS color field in the frame's physical layer header is different from the BSS color of the BSS to which the STA is associated, the STA may classify the frame as a frame from an overlapping BSS (OBSS). OBSS frames are designated as inter-BSS frames, which are different from Intra-BSS frames. When an Inter-BSS frame is detected, a STA may concurrently transmit another frame using spatial reuse or may enter a power saving mode for the duration of the frame. In some implementations, a WLAN apparatus may configure all the co-hosted BSSs to use the same color so that STAs classify the frames as Intra-BSS. For Intra-BSS frames, the STA may refrain from concurrently transmitting using SR. IEEE 802.11ax provides a mechanism for STAs to report color collision—such as when a neighboring AP is using the same color as the BSS to which it is associated. In one aspect of this disclosure, when a STA is aware that a co-hosted BSS is present, the STA may filter the color collisions associated with co-hosted BSS since the co-hosted BSSs are expected to use the same BSS color. Any BSS color collisions for co-hosted BSSs may be filtered from a color collision algorithm so that the STA does not report a BSS color collision of a co-hosted AP.

In various implementations, a VAP may transmit a management frame that informs a STA about co-located or co-hosted BSSs. A management frame (from a VAP corresponding to a first BSSID) may include discovery or other profile information for co-located or co-hosted BSSs (including co-located BSSs that are part of a Multiple BSSID Set). For example, the discovery information may include a BSS identifier (BSSID), Service Set identifier (SSID), operating class, band, channel, an indicator whether the second BSS transmit periodic discovery frames (for example unsolicited broadcast Probe Response frames or FILS Discovery frames every 20 milliseconds) on its channel, or an indicator whether the second BSS belongs to a Multiple BSSID Set. The discovery information may assist a STA in discovering a co-located BSS in another band. For example, a first BSS (such as, operating in a 2.4 GHz or 5 GHz band) can advertise discovery information regarding a co-located BSS (such as, operating in a 6 GHz band) that is being operated at the same WLAN apparatus. The discovery information also may include other information about a co-located BSS such as a security parameter, restrictions on transmit power (if any), load conditions (such as channel load, or BSS load, or number of STAs associated with the co-located BSS). The discovery information may include access parameters (such as quality of service settings or guarantees) regarding the co-located BSS. In the case where the co-located BSS is part of a Multiple BSSID Set, the discovery information may indicate whether the co-located BSS is a TxBSSID or NonTxBSSID or other parameters that can help quickly discovery and identify BSSIDs in the Multiple BSSID set.

A STA may receive the management frame to learn about the first BSS as well as the co-located or co-hosted BSSs. In some implementations, the management frame may signal the presence of co-located or co-hosted BSSs in a field referred to as the High Efficiency (HE) Operation element. In some implementations, the management frame may include a neighbor report (such a management frame that includes a Neighbor Report element or a Reduced Neighbor Report element). A bit in the neighbor report may signal whether or not a BSSID in the neighbor report is associated with a co-located or co-hosted BSS.

In some implementations, if there are multiple co-located BSSs (either as part of a multiple BSSID set or operating on different channels) the discovery information may indicate whether all the co-located APs are reported in the neighbor report by the reporting AP. The indication may be applicable to a particular channel (such as to indicate whether all the co-located APs on a particular channel are reported or not) or applies to a particular band (such as a 5 GHz AP providing indication whether all the co-located 6 GHz APs are reported). Such signaling could be via a bit or a field in the management frame that includes the neighbor report. The bit or field may be present in the neighbor report itself or in another element carried in the management frame. For example, a first value (such as "1") may indicate the report is complete (it includes information for all the co-located BSSs) while a second value (such as "0") may indicate that the neighbor report includes a partial list of co-located BSSs.

There may be several ways to identify co-located or co-hosted BSSs in a management frame. For example, if the BSSIDs of the co-located or co-hosted BSSs are contiguously numbered (such as, contiguous to a first BSSID of the VAP transmitting the management frame), then the VAP may use a short-hand value to indicate the BSSID range of the co-located or co-hosted BSSs. However, if the BSSIDs are not contiguous, the VAP may use the neighbor report to inform the STA regarding the co-located or co-hosted BSSs. By examining different portions of the management frame, a recipient STA can unambiguously determine the BSSIDs of co-located or co-hosted BSSs.

In some implementations, a VAP may transmit an HE Operation element that indicates the VAP transmitting the HE Operation element is part of a set of co-located or co-hosted VAPs that are operating in the same WLAN apparatus. An HE Operation element may be transmitted periodically in beacon frames or may be transmitted at any time via other management frames (such as probe response or (re)association response frames). In some implementations, the HE Operation element may include a bit or a field (which may be referred to as a co-located BSS bit or subfield, or a co-hosted BSS bit or subfield) to indicate the VAP transmitting the HE Operation element is part of a set of co-located or co-hosted VAPs. For example, the bit or field may be an existing reserved bit or field, a repurposed bit or field, or a new bit or field. In some implementations, the HE Operation element may also include a field that indicates a range of BSSIDs that may correspond to the set of co-located or co-hosted VAPs. In some implementations, a VAP does not have to exist for every BSSID in the range of BSSIDs; however, a VAP that is associated with a BSSID in the range is part of the set of co-located or co-hosted VAPs. The HE Operation element may also include other information (such as channel number, operating class, BSSID, SSID, BSS color, etc.) about the co-located or co-hosted VAPs and the corresponding BSSs.

In some implementations, a VAP may transmit a neighbor report (including a Neighbor Report element or Reduced Neighbor Report (RNR) element) to identify (similarly identified as neighboring APs) VAPs that are supported by and operating in the same WLAN apparatus. A neighbor report (such as an RNR element) may be transmitted periodically in beacon frames or may be transmitted at any time via other management frames (such as probe response or (re)association response frames). In some implementations, the neighbor report may include an indication to indicate that neighboring APs identified in the neighbor report are VAPs supported and operating in the same WLAN apparatus as the VAP transmitting the neighbor report. In some implementations, the indication may be a bit or a field (which may be referred to as a co-located BSS bit or subfield, or a co-hosted BSS bit or subfield) included in the neighbor report. For example, the bit or field may be an existing reserved bit or field, a repurposed bit or field, or a new bit or field. In some implementations, a neighbor report may include information (such as channel number, operating class, BSSID, SSID, etc.) about multiple co-located or co-hosted VAPs. For example, the neighbor report may include multiple entries or a list of entries, where each entry includes information (such as channel number, operating class, BSSID, SSID, etc.) about one of the VAPs. In some implementations, when a BSS is advertised as a co-located BSS in the neighbor report and the co-located BSS has the same band, channel, and operating class, that BSS may be deemed a co-hosted BSS.

In some implementations, the WLAN apparatus may use one or more of the Neighbor Report element, the VAP or virtual neighbor element, the RNR element, the HE Operation element, or the spatial reuse element in combination to signal information to STAs. For example, a VAP that is served by the WLAN apparatus may transmit one or more management frames that include one or more of the Neighbor Report element, the VAP or virtual neighbor element, the RNR element, the HE Operation element, or the spatial reuse element. In some implementations, other information elements of management frames may be used to advertise the co-located or co-hosted VAPs associated with the BSSs that are operating in the same WLAN apparatus.

In some implementations, co-hosted BSSs in a Co-Hosted BSS Set may use some shared control frames. For example, a control frame from a first co-hosted BSS (which may be referred to as a designated BSS, dominant BSS, master BSS, primary BSS, control BSS, or the like) may include information regarding a second co-hosted BSS (which may be referred to as a non-designated BSS, slave BSS, subordinate BSS, secondary BSS, or the like). Because the co-hosted BSSs may share a same operating class, channel, color, and the like, a STA may listen for communications that originate from either of the co-hosted BSSs. Rather than filter or disregard the control frame from a first co-hosted BSS to which it is not associated, the STA may process the control frame to determine if it includes information regarding the second co-hosted BSS to which it is associated. In some implementations, the first co-hosted BSS (master BSS) may aggregate control frames for other co-hosted BSSs. Examples of control frames that could include information for a co-hosted BSS may include a trigger frame, a multi-STA block acknowledgement, and null data packet (NDP) announcement. For example, a trigger frame sent in a first co-hosted BSS may include an identifier for a STA that is associated with a second co-hosted BSS. Because the first co-hosted BSS and the second co-hosted BSS are operated at the same WLAN apparatus (possibly using the same processor, memory, and the like), the VAPs for the co-hosted BSSs may share identifiers for STAs to include in a co-hosted control frame. Another example control frame includes a multi-STA block acknowledgment. A multi-STA block acknowledgment may include identifiers of multiple STAs (from either of the co-hosted BSSs) causing the multiple STAs to respond with block acknowledgments. In yet another example, a control frame may include an NDP announcement instructing identified STAs to transmit a null data packet. For example, one of the co-hosted BSSs may trigger NDPs from STAs to create a quiet period on the channel for sounding or interference measuring purposes.

In some implementations, a subordinate co-hosted BSS may identify the master co-hosted BSS, such as in a management frame (beacon frame, probe response frame, or association frame). For example, the subordinate co-hosted BSS may include an identifier (BSSID, MAC address, or the like) in a management frame (such as a beacon frame) to identify the master co-hosted BSS. In this way, a STA that is associated with the subordinate co-hosted BSS can be configured to monitor and process control frames from the master co-hosted BSS. In some implementations, the identifier of the master co-located BSS may be a new MAC address that is not specific to any of the co-hosted BSSs in the co-hosted BSS set.

Particular implementations of the subject matter described in this disclosure can be implemented to realize one or more of the following potential advantages. A WLAN apparatus can inform a STA regarding co-located or co-hosted BSSs. This may improve service for co-located or co-hosted BSSs as well as the STA. A STA can reduce power consumption by implementing power-saving measures such as sleeping during times when the wireless communication medium is in use by a co-located or co-hosted BSS. Additionally, collision avoidance and airtime utilization can be improved when the WLAN apparatus informs the STA regarding co-located or co-hosted BSSs.

FIG. 1 depicts a system diagram of an example WLAN apparatus operating co-located BSSs. The system diagram 100 includes a WLAN apparatus 150 that is communicatively coupled to a broadband network 160. For example, the WLAN apparatus 150 can implement multiple VAPs configured to transmit and receive wireless packets to and from a number of STAs according to the IEEE 802.11 family of standards (such as that defined by the IEEE 802.11-2016 specification or amendments thereof). The WLAN apparatus 150 may be communicatively coupled (or integrated) with a gateway device (not shown). A gateway device, such as a modem or router, may provide access to the broadband network 160. For example, the gateway device can couple to the broadband network through a cable, a fiber optic, a powerline, or DSL network connection. FIG. 1 shows a first STA 110, a second STA 120, a third STA 130, and a fourth STA 140. Each of the STAs 110, 120, 130, and 140 also may be referred to as a mobile station (MS), a mobile device, a mobile handset, a wireless handset, an access terminal (AT), a user equipment (UE), a subscriber station (SS), or a subscriber unit, among other possibilities. The STAs 110, 120, 130, and 140 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

The WLAN apparatus 150 is configured to operate multiple VAPs, such as a first VAP 151, a second VAP 152, a third VAP 153, and a fourth VAP 154. A single VAP (such as each of the VAPs 151, 152, 153, and 154) and an associated set of STAs that are associated with each VAP may be referred to as a basic service set (BSS), which is managed by the respective VAP. The BSS is identified by a service set identifier (SSID) that is advertised by the VAP. The VAP periodically broadcasts beacon frames ("beacons") to enable any STAs within wireless range of the VAP to establish or maintain a respective communication link (hereinafter also referred to as a "Wi-Fi link") with the VAP. For example, the beacons can include an identification of a primary channel used by the respective VAP as well as a timing synchronization function for establishing or maintaining timing synchronization with the VAP. The various STAs in the WLAN are able to communicate with external networks as well as with one another via the VAP and respective communication links.

In FIG. 1, each of the VAPs 151, 152, 153, and 154 are associated with a different respective BSS having a different respective BSSID and are operated as separate WLANs even though they are implemented by the same WLAN apparatus 150. Each respective BSS can have different wireless associations with client STAs. A STA can establish a wireless association (also referred to as a wireless link, wireless connection, or the like) with a VAP to access the broadband network via the WLAN apparatus 150. In FIG. 1, a first STA 110 has a first wireless association 112 with the first BSS corresponding to the first VAP 151; a second STA 120 has a second wireless association 122 with the second BSS corresponding to the second VAP 152; and a third STA 130 has a third wireless association 132 with the third BSS corresponding to the third VAP 153. To establish a wireless association with a VAP, each of the STAs is configured to perform passive or active scanning operations ("scans") on frequency channels in one or more frequency bands (for example, the 2.4 GHz, 5 GHz, 6 GHz or 60 GHz bands). To perform passive scanning, a STA listens for beacons, which are transmitted by respective VAPs at a periodic time interval referred to as the target beacon transmission time (TBTT) (measured in time units (TUs) where one TU is equal to 1024 microseconds (s)). To perform active scanning, a STA generates and sequentially transmits probe requests on each channel to be scanned and listens for probe responses from VAPs. Each STA may be configured to identify or select a VAP with which to associate based on the scanning information obtained through the passive or active scans, and to perform authentication and association operations to establish a wireless association with the selected VAP.

FIG. 1 additionally shows example coverage areas of the VAPs, which may represent basic service areas (BSAs) of the WLANs managed by the VAPs. The first VAP 151 implements a first BSS that provides a first coverage area 141. Similarly, the second VAP 152 implements a second BSS that provides a second coverage area 142, the third VAP 153 implements a third BSS that provides a third coverage area 143, and the fourth VAP 154 implements a fourth BSS that provides a fourth coverage area 144. For illustration purposes, the first coverage area 141, second coverage area 142, third coverage area 143, and fourth coverage area 144 are shown as different size ovals in the diagram. However, the sizes of the coverage areas may be similar to or different from each other and the shapes of the coverage areas may vary as a result of environmental obstructions or interference.

As a result of the increasing ubiquity of wireless networks, a STA may have the opportunity to select one of many BSSs within range of the STA or select among multiple VAPs that together form an extended service set (ESS) including multiple connected BSSs. An extended network station associated with the WLAN may be connected to a wired or wireless distribution system that may allow multiple APs to be connected in such an ESS. As such, a STA can be covered by more than one VAP and can associate with different VAPs at different times for different transmissions. Additionally, after association with a VAP, a STA also may be configured to periodically scan its surroundings to find a more suitable VAP with which to associate. For example, a STA that is moving relative to its associated VAP may perform a "roaming" scan to find another VAP having more desirable network characteristics such as a greater received signal strength indicator (RSSI) or a reduced traffic load.

The VAPs and STAs may function and communicate (via the respective communication links 112, 122, and 132) according to the IEEE 802.11 family of standards (such as that defined by the IEEE 802.11-2016 specification or amendments thereof including, but not limited to, 802.11ah, 802.11ay, 802.11ax, 802.11az, 802.11ba and Extremely High Throughput (EHT)). These standards define the WLAN radio and baseband protocols for the PHY and medium access control (MAC) layers. The VAPs and STAs transmit and receive wireless communications (hereinafter also referred to as "Wi-Fi communications") to and from one another in the form of physical layer (PHY) protocol data units (PPDUs). The VAPs and STAs in the WLAN may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the VAPs and STAs described herein also may communicate in other frequency bands, such as the 6 GHz band, which may support both licensed and unlicensed communications. The VAPs and STAs also can be configured to communicate over other frequency bands such as shared licensed frequency bands, where multiple operators may have a license to operate in the same or overlapping frequency band or bands.

Access to the shared wireless medium is governed by a Distributed Coordination Function (DCF). With a DCF, there is no centralized master device allocating time and frequency resources of the shared wireless medium. On the contrary, before a wireless communication device, such as a VAP or a STA, is permitted to transmit data, it must wait for a particular time and then contend for access to the wireless medium. In some implementations, the wireless communication device may be configured to implement the DCF through the use of Carrier Sense Multiple Access (CSMA) with Collision Avoidance (CA) (CSMA/CA) and timing intervals. Before transmitting data, the wireless communication device must perform a Clear Channel Assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a Network Allocation Vector (NAV), an indicator of a time when the medium should next become idle. The NAV is reset each time a valid frame is received that is not addressed to the wireless communication device. The NAV effectively serves as a time duration that must elapse before the wireless communication device may contend for access even in the absence of a detected symbol or a detected energy below the relevant threshold.

As described above, the DCF is implemented through the use of time intervals. These time intervals include the slot time (or "slot interval") and the Inter-Frame Space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as the IEEE 802.11 family of standards (such as that defined by the IEEE 802.11-2016 specification or amendments thereof).

When the NAV reaches 0, the wireless communication device performs the physical carrier sensing. If the channel remains idle for the appropriate IFS (for example, the DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder of a Transmit Opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication devices generates a new PPDU for transmission in a new Transmit Opportunity (TXOP), it randomly selects a new backoff timer duration. The available distribution of the numbers that may be randomly selected for the backoff timer is referred to as the Contention Window (CW). If, when the backoff timer expires, the wireless communication device transmits the PPDU but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four Access Categories (ACs): voice (AC_VO), video (AC_VI), background (AC_BK), and best effort (AC_BE). This enables particular types of traffic to be prioritized in the network.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz. But larger channels can be formed through channel bonding. For example, PPDUs conforming to the IEEE 802.11n, 802.11ac and 802.11ax standard amendments may be transmitted over physical channels having bandwidths of 40 MHz, 80 MHz or 160 MHz by bonding together two or more 20 MHz channels.

Each PPDU is a composite structure that includes a PHY preamble and a physical layer convergence protocol (PLCP) service data unit (PSDU). The information provided in the preamble may be used by a receiving device to decode the subsequent data in the PSDU. A legacy portion of the preamble may include a legacy short training field (STF) (L-STF), a legacy long training field (LTF) (L-LTF), and a legacy signaling field (L-SIG). The legacy preamble may be used for packet detection, automatic gain control and channel estimation, among other uses. The legacy preamble also may be used to maintain compatibility with legacy devices. In instances in which PPDUs are transmitted over a bonded channel, the L-STF, L-LTF, and L-SIG fields may be duplicated and transmitted in each of the multiple component channels. For example, in IEEE 802.11n, 802.11ac or 802.11ax implementations, the L-STF, L-LTF, and L-SIG fields may be duplicated and transmitted in each of the component 20 MHz channels. The format of, coding of, and information provided in the non-legacy portion of the preamble is based on the particular IEEE 802.11 protocol.

The WLAN apparatus 150 includes a number of antennas 155. In some implementations, the VAPs 151, 152, 153, and 154 may share one or more of the same antennas 155. The antennas 155 may enable single-user (SU) multiple-input multiple-output (MIMO) or multi-user (MU) MIMO communications. Multi-user (MU) transmissions refers to the concurrent transmissions from one device to each of multiple devices (for example, multiple simultaneous downlink (DL) communications from a VAP to corresponding STAs), or concurrent transmissions from multiple devices to a single device (for example, multiple simultaneous uplink (UP) transmissions from corresponding STAs to a VAP). To support the MU transmissions, the VAPs and STAs may utilize multi-user orthogonal frequency division multiple access (MU-OFDMA) and multi-user multiple-input, multiple-output (MU-MIMO) techniques.

Referring to FIG. 1, a fourth STA 140 may not have an existing wireless association with any of the VAPs at the WLAN apparatus. In an illustrative example of some implementations, a fourth STA 140 may enter the vicinity of the WLAN apparatus 150. The fourth STA 140 may observe management frames (such as a Beacon Frames or Probe Response Frames) to determine the BSS(s) available in that location. Each of the co-located VAPs 151, 152, 153, and 154 may separately transmit a management frame for their respective BSS. For example, the first VAP 151 may periodically broadcast a Beacon Frame to advertise the first BSS, the second VAP 152 may periodically broadcast its own Beacon frame to advertise the second BSS, and so on. The fourth STA 140 may learn about the various BSSs via these management frames. However, without more information, the fourth STA 140 may be unaware that the BSSs are co-located or co-hosted BSSs that share the same antenna(s) at the same WLAN apparatus 150. In accordance with this disclosure, a transmitting VAP can provide an identification of co-located or co-hosted BSSs.

For brevity, the following description refers to co-located BSSs (managed by the VAPs 151, 152, 153, and 154). As described above, co-hosted BSSs are co-located BSSs that share a same band, channel, and operating class. Therefore, the techniques for advertising co-located BSSs also may be used to advertised co-hosted BSSs. Various implementations include several ways for a VAP to advertise the BSSIDs of co-located BSSs. In some implementations, a management frame, such as a Beacon Frame or a Probe Response Frame, may include an indication that the transmitting VAP is a part of a Co-Located BSS Set. For example, the indication can be included in a high efficiency (HE) operation element of the management frame. In some implementations, the management frame may include an indication, such as a "MaxBSSID field", to signal that a group of contiguously numbered BSSIDs belong to a Co-Located BSS Set. The MaxBSSID field may carry a value n that indicates up to $2^n$ contiguous BSSIDs (such that the 48-n most significant bits are common to all the co-located BSSIDs). This technique may be used when some or all of the BSSIDs (in the Co-Located BSS Set) are contiguous values that share the same most significant bits. However, in some implementations, the BSSIDs are not contiguous. For example, the first VAP 151 in the WLAN apparatus 150 may have a globally unique media access control (MAC) address as its BSSID, while the other VAPs 152, 153, 154 may use different (non-contiguous) addresses as BSSIDs for their respective BSSs. To signal non-contiguous BSSIDs, the management frame may include the BSSIDs for co-located BSSs in another portion of the management frame (rather than the MaxBSSID field).

In some implementations, the management frame may include a neighbor report (such as a management frame that includes a Neighbor Report element, a Reduced Neighbor Report, or some other element) that advertises a BSSID of a co-located BSS. The neighbor report may traditionally advertise a neighboring AP (in a different WLAN apparatus). In some implementations of this disclosure, the neighbor report could be repurposed to advertise a BSSID of a co-located BSS. The neighbor report (such as a Neighbor Report element) may include a 6-byte field for the BSSID and 1-byte field for BSSID Information. The 6-byte field is large enough to include a complete 6-byte MAC address for the co-located BSSID. In some implementations, the neighbor report can be modified to include an indication that the respective BSSID is associated with a co-located BSS. The indication in the neighbor report can include one or more bits indicating that the BSSID in that neighbor report is a co-located BSS; that is, a BSS that is implemented by the same physical WLAN apparatus as the BSS that transmitted the neighbor report. There may be separate neighbor reports in the management frame for each co-located BSS. In some implementations, if the BSS that sends the management frame has the same operating class, channel, and color as the co-located BSS indicated in the management frame, a STA may determine that the co-located BSS is also co-hosted BSS.

In various implementations, a management frame may include various combinations of the MaxBSSID field (in a first portion of the management frame) and the neighbor report (in another portion of the management frame). For example, a STA may process the neighbor report(s) in the management frame to determine if the neighbor report indicates a co-located BSS, which may be in addition to the co-located BSSs indicated by the MaxBSSID field. The STA also may process one or more bits in the MaxBSSID field to discover further co-located BSSs. As described above, the neighbor report can be used for either contiguous or non-contiguous BSSIDs. In some implementations, a neighbor report can additionally advertise one or more co-located BSSs in addition to those advertised in the MaxBSSID field.

As described above, the management frame may include an indicator in an HE Operation element. For example, the HE Operation element may include an indicator in a Co-Located BSS field (as part of the HE Operation element) to signal that the transmitting VAP is a part of a Co-Located BSS Set. If the Co-located BSS field of HE Operation element is set to 1, a STA may look to other parts of the management frame to determine the BSSIDs that belong to the Co-Located BSS Set. For example, the STA may observe the MaxBSSID field to discover a range of contiguously numbered BSSIDs that belong to the Co-Located BSS Set. The STA also may process the neighbor report (s) in the management frame to discover any neighbor reports that include a Co-Located BSS field for a particular BSSID. Thus, if the HE Operation element is set to 1, the STA may determine that the Co-Located BSS Set includes BSSIDs that are indicated by both the MaxBSSID field and the neighbor report (such as in a Neighbor Report element) that are marked as co-located BSSs. In such case, the MaxBSSID field may signal contiguous BSSIDs while the Neighbor Report element(s) may be used to signal noncontiguous BSSIDs. In another example, if the Co-located BSS field of HE operation element is set to 1 and the MaxBSSID field is absent or carries a value 0, then the neighbor report could be the sole way to identify all the co-located BSSs. In such case, the BSSIDs could be contiguous, non-contiguous or a combination.

In another example implementation, a MaxBSSID field to advertise a large range (such as n=46) of BSSIDs associated with a Co-Located BSSID set. This can be beneficial when manufacturer of a WLAN apparatus desires to set up BSSIDs with one of the MSB-bits changed (for example the Locally Administered (LA) bit or the Individual/Group (I/G) bit changed). Such a technique may be useful when a vendor does not have many globally unique addresses in a contiguous address pool and the n-LSBs are different. By advertising a large pool, the MaxBSSID field may cover a very large discontinuous address space.

In some implementations, the WLAN apparatus 150 may have a Co-Located BSS Capability module 170 and a management frame generation module 172 to perform some or all of the operations described herein. For example, the Co-Located BSS Capability module 170 may coordinate with the one or more VAPs and may store the BSSIDs for the co-located BSSs. The management frame generation module 172 may generate the management frames for one or more of the co-located BSSs. The management frame generation module 172 may be configured to include a Co-Located BSS indicator and to identify the BSSIDs for the co-located BSS set in a management frame.

In some implementations, the first VAP 151 and the second VAP 152 may use a same band, channel, color, operating class, or the like. Therefore, the first BSS (corresponding to the first VAP 151) and the second BSS (corresponding to the second VAP 152) may be co-hosted BSSs, referred to as a Co-Hosted BSS Set. One of the co-hosted BSSs may be designated to send control fames that aggregate control information for the other co-hosted BSS. For example, the first BSS (corresponding to the first VAP 151) may be referred to as a designated BSS, dominant BSS, master BSS, control BSS, or the like, and may signal control information for the second BSS (corresponding to the second VAP 152). The WLAN apparatus 150 may have a Co-Hosted Control Frame Generation module 174 configured to prepare control frames that can be sent by the first VAP 151. The second STA 120 may be associated with the second VAP 152 (and the second BSS). However, because the first BSS and the second BSS use the same channel, color, operating class, and the like the second STA 120 may receive communications that originate from either of the first VAP 151 or the second VAP 152. The Co-Hosted Control Frame Generation module 174 may prepare a control frame for transmission by the first VAP 151 on behalf of the Co-Hosted BSS Set. The second STA 120 may process the control frame from the first BSS (corresponding to the first VAP 151) to determine if it includes information regarding the second BSS (corresponding to the second VAP 151). For example, the control frame may be a trigger frame or other control information that instructs the second STA 120 when to communicate with the second VAP 151.

The types of management frames and values for the indicator are merely examples. In some other implementations, a different management frame or different specified values may be used. In some implementations, the advertisement of co-located BSSs may be specified in a standard specification. For example, some implementations of the techniques in this disclosure may be mandated for IEEE 802.11ax devices. In some other implementations, the techniques may be optional or may be disregarded by legacy devices that do not support newer standard specifications.

Figure 2:
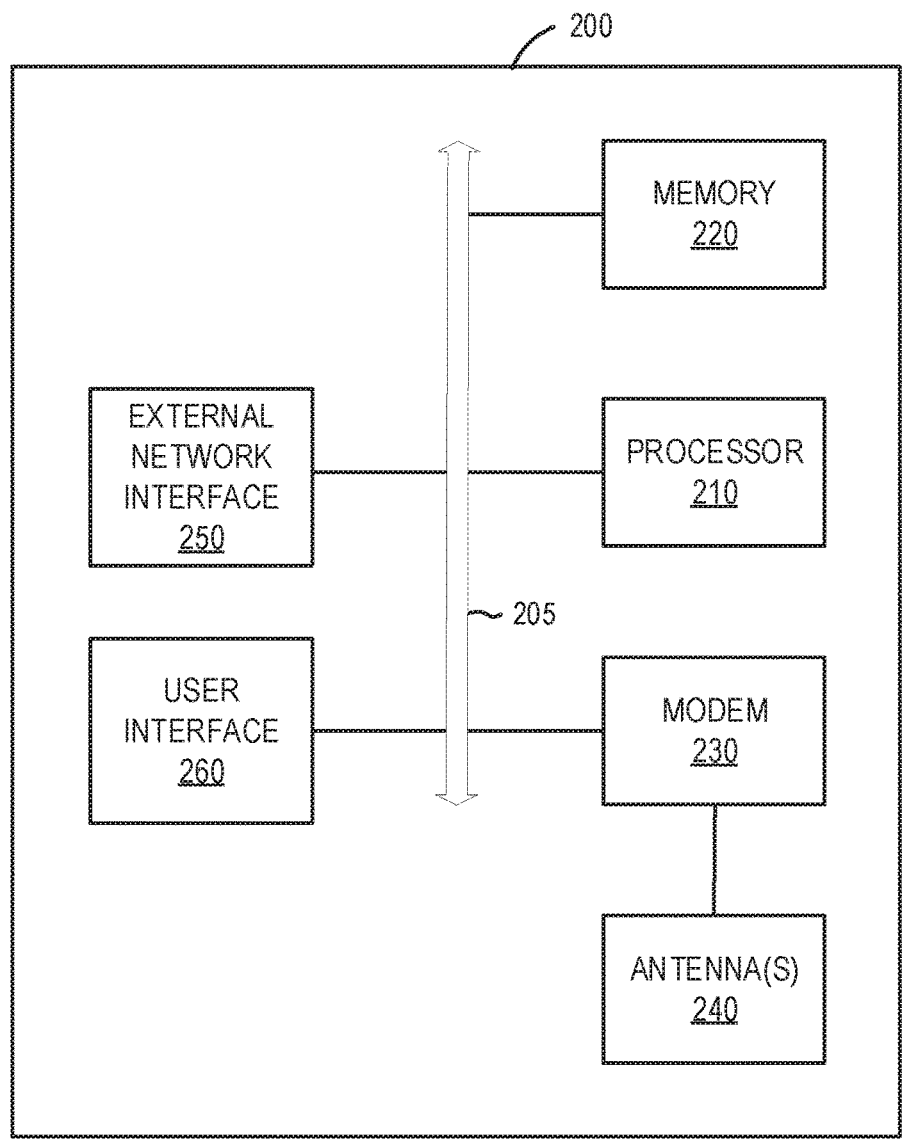
FIG. 2 shows a block diagram of an example access point (AP) for use in wireless communication.

FIG. 2 shows a block diagram of an example access point (AP) 200 for use in wireless communication. For example, the AP 200 may be an example of aspects of the WLAN apparatus 150 described with reference to FIG. 1. The AP 200 is capable of transmitting and receiving wireless communications (for example, in the form of wireless packets), as well as of encoding and decoding such communications. For example, the wireless communications can include Wi-Fi packets including frames conforming to an IEEE 802.11 standard (such as that defined by the IEEE 802.11-2016 specification or amendments thereof including, but not limited to, 802.11ah, 802.11ay, 802.11ax, 802.11az, and 802.11ba). The AP 200 includes at least one processor 210 (collectively "the processor 210"), at least one memory 220 (collectively "the memory 220"), at least one modem 230 (collectively "the modem 230"), at least one antenna 240 (collectively "the antenna 240"), at least one external network interface 250 (collectively "the network interface 250") and, in some instances, a user interface (UI) 260. Each of the components (or "modules") described with reference to FIG. 2 can communicate with other ones of the components, directly or indirectly, over at least one bus 205.

The processor 210 can include an intelligent hardware device such as, for example, a central processing unit (CPU), a microcontroller, an application-specific integrated circuit (ASIC), or a programmable logic device (PLD) such as a field programmable gate array (FPGA), among other possibilities. The processor 210 processes information received through the modem 230 and the external network interface 230. The processor 210 also can process information to be sent to the modem 230 for transmission through the antenna 240 and information to be sent to the external network interface 230. The processor 210 can generally be configured to perform various operations related to generating and transmitting a downlink frame and receiving an uplink frame.

The memory 220 can include random access memory (RAM) and read-only memory (ROM). The memory 220 also can store processor- or computer-executable software (SW) code containing instructions that, when executed by the processor 210, cause the processor to perform various functions described herein for wireless communication, including generation and transmission of a downlink frame and reception of an uplink frame.

The modem 230 is generally configured to modulate packets and to provide the modulated packets to the antenna 240 for transmission, as well as to demodulate packets received from the antenna 240 to provide demodulated packets. The modem 230 generally includes or is coupled with at least one radio frequency (RF) transmitter and at least one RF receiver, which may be combined into one or more transceivers, and which are in turn coupled to one or more antennas 240. For example, in some AP implementations, the AP 200 can include multiple transmit antennas (each with a corresponding transmit chain) and multiple receive antennas (each with a corresponding receive chain). The modem 230 can communicate bi-directionally, via the antenna 240, with at least one STA (such as the STAs 110, 120, 130, and 140 described with reference to FIG. 1).

The modem 230 may include digital processing circuitry, automatic gain control (AGC), a demodulator, a decoder and a demultiplexer. The digital signals received from the transceivers are provided to digital signal processing circuitry configured to acquire a received signal, for example, by detecting the presence of the signal and estimating the initial timing and frequency offsets. The digital signal processing circuitry is further configured to digitally condition the digital signals, for example, using channel (narrowband) filtering, analog impairment conditioning, such as correcting for I/Q imbalance, and applying digital gain to ultimately obtain a narrowband signal. The output of the digital signal processing circuitry is fed to the AGC, which is configured to use information extracted from the digital signals, for example, in one or more received training fields, to determine an appropriate gain. The output of the digital signal processing circuitry also is coupled with the demodulator, which is configured to extract modulated symbols from the signal and to reverse map the symbols to points in a modulation constellation to provide demodulated bits. The demodulator is coupled with the decoder, which is configured to decode the demodulated bits to provide decoded bits, which are then fed to the demultiplexer for demultiplexing. The demultiplexed bits may then be provided to the processor 210 for processing, evaluation or interpretation, for example, by one or more host applications executing on the processor.

The AP 200 may communicate with a core or backhaul network through the external network interface 250 to gain access to external networks including the Internet. For example, the external network interface 250 may include one or both of a wired (for example, Ethernet) network interface or wireless (for example, LTE, 4G or 5G) network interface.

Figure 3:
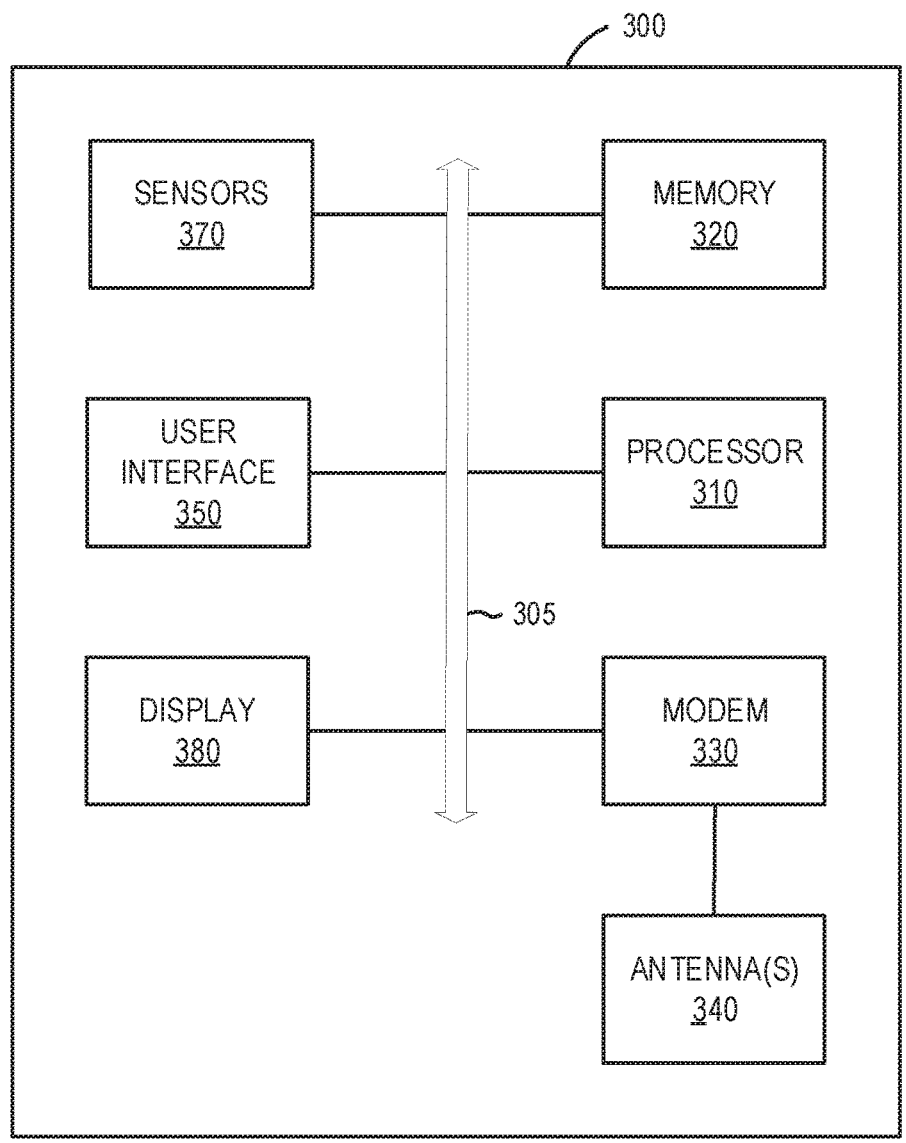
FIG. 3 shows a block diagram of an example (STA) for use in wireless communication.

FIG. 3 shows a block diagram of an example wireless station (STA) 300 for use in wireless communication. For example, the STA 300 may be an example of aspects of the STAs described with reference to FIG. 1. The STA 300 is capable of transmitting and receiving wireless communications, as well as of encoding and decoding such communications. The wireless communications may conform to any of a number of different wireless communication protocols. For example, the STA 300 may be capable of transmitting and receiving Wi-Fi packets including frames conforming to an IEEE 802.11 standard, such as defined by the IEEE 802.11-2016 specification or amendments thereof including, but not limited to, 802.11ah, 802.11ay, 802.11ax, 802.11az, and 802.11ba). Additionally or alternatively, the STA 300 may be capable of transmitting and receiving Bluetooth packets conforming to a Bluetooth standard, such as defined in IEEE 802.15 or by the Bluetooth SIG. Additionally or alternatively, the STA 300 may be capable of transmitting and receiving wireless packets associated with the Long Term Evolution (LTE), International Mobile Telecommunications-Advanced (IMT-Advanced) 4G or 5G standards.

The STA 300 includes at least one processor 310 (collectively "the processor 310"), at least one memory 320 (collectively "the memory 320"), at least one modem 330 (collectively "the modem 330") and at least one antenna 340 (collectively "the antenna 340"). In some implementations, the STA 300 additionally includes some or all of the following: a user interface (UI) 350 (such as a touchscreen or keypad), one or more sensors 370 (such as one or more inertial sensors, accelerometers, temperature sensors, pressure sensors, or altitude sensors), and a display 380. Each of the components (or "modules") described with reference to FIG. 3 can communicate with one another, directly or indirectly, over at least one bus 305.

The processor 310 includes an intelligent hardware device such as, for example, a CPU, a microcontroller, an ASIC or a PLD such as an FPGA, among other possibilities. The processor 310 processes information received through the modem 330 as well as information to be sent to the modem 330 for transmission through the antenna 340. The processor 310 can be configured to perform various operations related to receiving a downlink frame and generating and transmitting an uplink frame.

The memory 320 can include RAM and ROM. The memory 320 also can store processor- or computer-executable SW code containing instructions that, when executed, cause the processor 310 to perform various functions described herein for wireless communication, including reception of a downlink frame and generation and transmission of an uplink frame.

The modem 330 is generally configured to modulate packets and provide the modulated packets to the antenna 340 for transmission, as well as to demodulate packets received from the antenna 340 to provide demodulated packets. The modem 330 generally includes or is coupled with at least one radio frequency (RF) transmitter and at least one RF receiver, which may be combined into one or more transceivers, and which are in turn coupled to one or more antennas 340. For example, in some implementations, the STA 300 can include multiple transmit antennas (each with a corresponding transmit chain) and multiple receive antennas (each with a corresponding receive chain). The modem 330 can communicate bi-directionally, via the antenna 340, with at least one AP (or VAP). As is described above, in some implementations, the modem also can communicate bi-directionally, via the antenna 340, with other STAs directly without the use of an intermediary AP.

The modem 330 may include digital processing circuitry, automatic gain control (AGC), a demodulator, a decoder and a demultiplexer. The digital signals received from the transceivers are provided to digital signal processing circuitry configured to acquire a received signal, for example, by detecting the presence of the signal and estimating the initial timing and frequency offsets. The digital signal processing circuitry is further configured to digitally condition the digital signals, for example, using channel (narrowband) filtering, analog impairment conditioning, such as correcting for I/Q imbalance, and applying digital gain to ultimately obtain a narrowband signal. The output of the digital signal processing circuitry is fed to the AGC, which is configured to use information extracted from the digital signals, for example, in one or more received training fields, to determine an appropriate gain. The output of the digital signal processing circuitry also is coupled with the demodulator, which is configured to extract modulated symbols from the signal and to reverse map the symbols to points in a modulation constellation to provide demodulated bits. The demodulator is coupled with the decoder, which is configured to decode the demodulated bits to provide decoded bits, which are then fed to the demultiplexer for demultiplexing. The demultiplexed bits may then be provided to the processor 310 for processing, evaluation or interpretation, for example, by one or more host applications executing on the processor.

Figure 4:
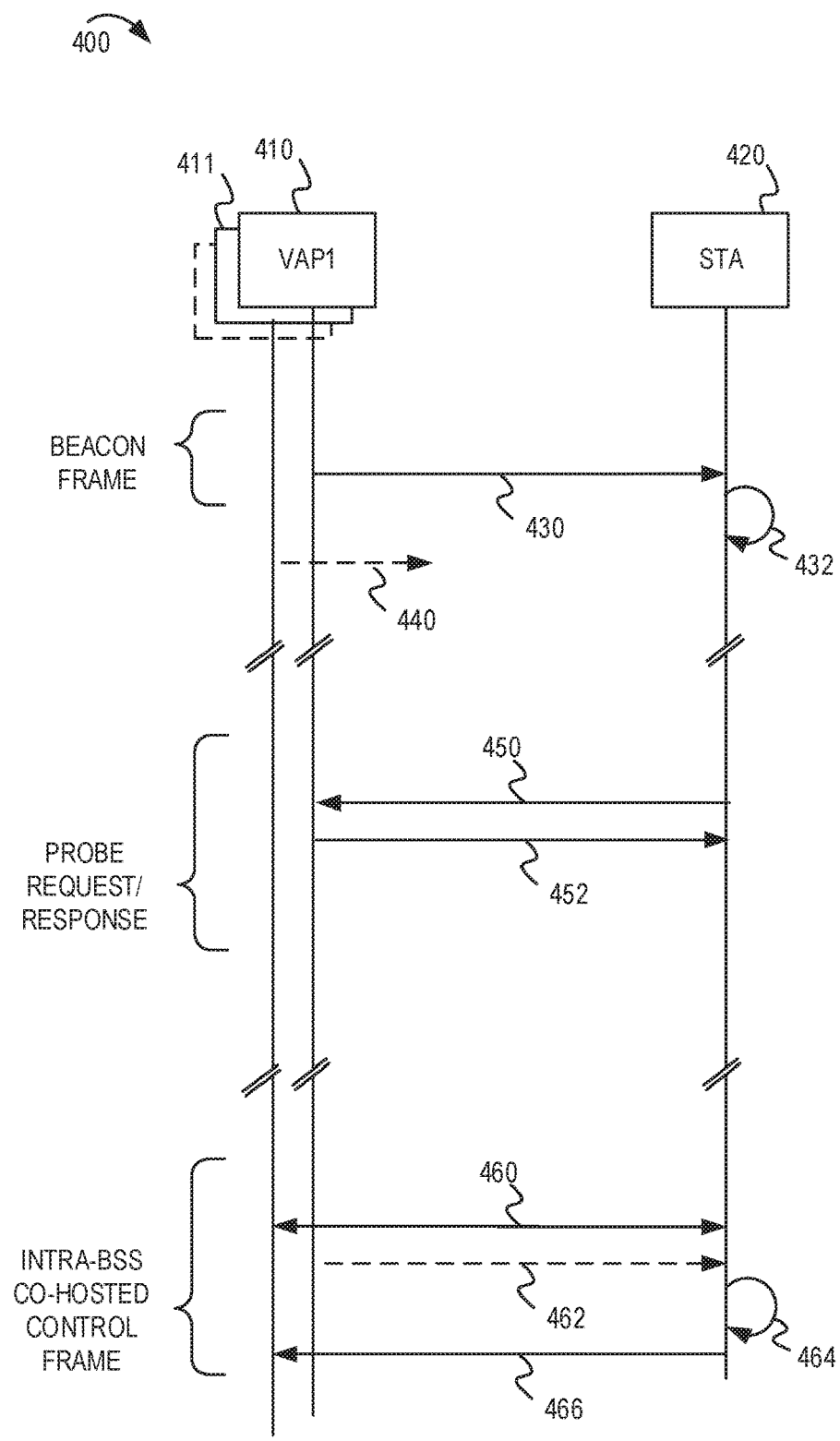
FIG. 4 depicts a message flow diagram with several examples of a WLAN apparatus signaling identifiers for co-located or co-hosted BSSs.

FIG. 4 depicts a message flow diagram with several examples of a WLAN apparatus signaling identifiers for co-located or co-hosted BSSs. A first VAP 410 is part of a Co-Located BSS Set that include another VAP 411. A STA 420 is in the vicinity of the first VAP 410 such that the STA 420 can receive management frames from the first VAP 410. The message flow diagram 400 provides examples of management frames that may advertise BSSIDs of co-located or co-hosted BSSs.

In a first example, the first VAP 410 transmits a beacon frame 430 that includes a configuration information about a first BSS associated with the first VAP 410. The beacon frame 430 may include an indicator that the first BSS is part of a Co-Located BSS Set. In other words, the indicator advises the STA 420 that the first BSS is operated by a VAP in the same physical WLAN apparatus as other BSSs in the Co-Located BSS Set. The beacon frame 430 may include the BSSID(s) for the co-located BSS(s). For example, the beacon frame 430 may include a value in the MaxBSSID field if the co-located BSSs have contiguous BSSIDs. The beacon frame 430 may include a Neighbor Report element to describe the BSSID of a co-located BSS. The Neighbor Report element may include an indicator to specify that the BSSID in that Neighbor Report element is part of the Co-Located BSS Set. At 432, the STA 420 can process the beacon frame 430 to determine the Co-Located BSS Set. The STA 420 can update its settings for power-saving, spatial reuse, and NAV based on the presence of the Co-Located BSS Set. For example, the STA 420 may enter a power saving mode when it detects a transmission from a co-located BSS with which the STA is not currently associated. The STA 420 may update its NAV to avoid transmitting during a time period that is reserved for the co-located BSSs. The other VAP 411 also may transmit a beacon frame 440. In the beacon frame 440, the other VAP 411 may include the BSSID of the first VAP 410 and indicate that the first VAP 410 is part of the Co-Located BSS Set.

In a second example, the STA 420 may transmit a Probe Request Frame 450 to the first VAP 410 to request the BSSIDs. The Probe Request Frame 450 may include an indicator to specify whether the STA 420 supports the Co-Located BSS Set capability. In the example of FIG. 4, the Probe Request Frame 450 may indicate that the STA 420 supports the Co-Located BSS Set (or Co-Hosted BSS Set) capability. The first VAP 410 may respond with a Probe Response Frame 452 including information about the co-located BSSs in the Co-Located BSS Set.

In a third example, the STA 420 may establish a wireless association 460 with a second VAP 411 that is operating a co-hosted BSS that shares the same wireless channel as a first BSS (corresponding with the first VAP 410). The STA 420 may indicate that it supports co-hosted BSS control frame aggregation capability if the second VAP 411 supports the features in this disclosure. For example, the STA 420 may set one or more capability bits in a management frame (such as an association request) to indicate support for the co-hosted BSS control frame aggregation feature. In some implementations, the STA may set a bit in the HE Capabilities Information Element in a message to the second VAP 411 to indicate that the STA supports reception of a co-hosted BSS control frame from a master BSS of a Co-Hosted BSS Set. As a result of both the STA 420 and the second VAP 411 supporting the feature, the second VAP 411 may inform the STA 420 of an address or identifier of the master BSS. For example, the second VAP 411 may include a field in the HE Operation element to identify a master BSS (such as an identifier of the first VAP 410) or indicate that it is the master AP in the co-hosted set. When establishing the wireless association 460, the second VAP 411 may indicate an address of the first VAP 410 as a co-hosted BSS. For example, the second VAP 411 may indicate a BSSID, a MAC address, or the like associated with the first VAP 410. In some implementations, the identifier may be associated with the Co-Hosted BSS Set and may not be specific to any particular VAP.

The first VAP 410 may send a control frame 462 (in accordance with a co-hosted BSS control frame aggregation capability) that includes control information regarding the Co-Hosted BSS Set. For example, the control frame 462 from the first VAP 410 may include a trigger frame for the STA 420 even though the STA 420 is not associated with the first VAP 410. However, since the first VAP 410 and the second VAP 411 are related to each other as co-hosted BSSs and have informed the STA 420 that they are co-hosted BSSs, the STA 420 may process the control frame 462. At 464, the STA 420 may process the control frame 462 from the first VAP 410 and determine that the control frame 462 includes a trigger instruction to the STA 420. As a result of the trigger instruction, the STA 420 may send a trigger response 466 to the second VAP 411. There are many variants of trigger instructions which can cause the STA to communicate with the second VAP 411. For example, the trigger frame may include trigger instructions such as a basic trigger, a buffer status report poll (BSRP), a bandwidth query report poll (BQRP), a multi-user RTS (MURTS), or the like. Each of the examples of trigger instructions may identify particular STAs (such as STA 420), causing those STAs to respond to their respective VAP. Other types of trigger frames may be used with the co-hosted BSS control frame aggregation capability.

As described previously, a trigger frame is only one example of a control frame that can be used with co-hosted BSSs. Other examples include a multi-STA block acknowledgment request, an NDP announcement, or the like. The first VAP 410 and the second VAP 411 belonging to the same Co-Hosted BSS Set may coordinate with each other locally at the WLAN apparatus. For example, the first VAP 410 and the second VAP 411 may be instances of software executed by the same processor and memory at the WLAN apparatus. The instances of software may coordinate using instructions executed at the processor or by storing information in memory that is accessible by both instances.

Figure 5:
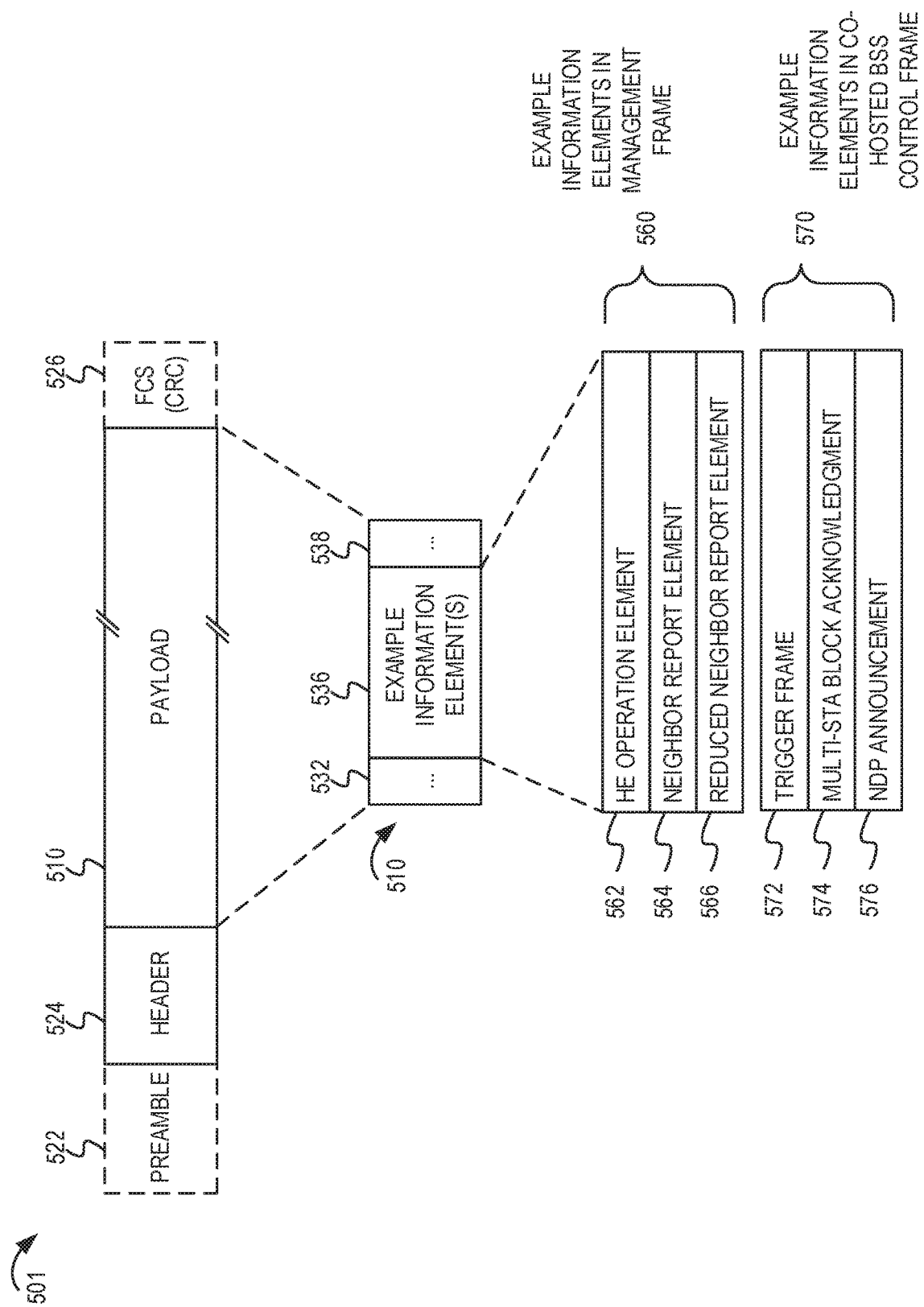
FIG. 5 depicts a conceptual diagram of an example message for signaling identifiers for co-located or co-hosted BSSs.

FIG. 5 depicts a conceptual diagram of an example message for signaling identifiers for co-located or co-hosted BSSs. For example, the example message 501 may be sent from a WLAN apparatus. The example message 501 may include a preamble 522, a header 524, a payload 510, and a frame check sequence (FCS) 526. The preamble 522 may include one or more bits to establish synchronization. The preamble 522 may be used, for example, when a dedicated discovery channel uses a listen-before-talk, contention-based access, or carrier sense access. In some implementations, if the dedicated discovery channel uses a scheduled timeslot for transmission, the preamble 522 may be omitted. The header 524 may include a source network identifier (such as the TxBSSID of the sending VAP), the length of data frame, or other frame control information. In some implementations, the header 524 also may indicate a technology type associated with a technology-specific payload (if the payload 510 is specific to a particular technology type or types). The payload 510 may be used to convey management information about other BSSs in a Multiple BSSID set. The management information may be organized or formatted in a variety of ways. For example, in some implementations, the management information may be organized in predefined field or in a tag-length-value format. One example of the message 501 may be an enhanced beacon frames that may be used by IEEE 802.11 (similar to the beacon frames defined for IEEE 802.11ax). Another example of a message 501 may be a synchronization frame or other short frame that may be defined for other technologies (or next generation of IEEE 802.11, beyond 802.11ax). Other types of messages could be used if the AP supports a different technology (different from IEEE 802.11).

The payload 510 may be organized with a message format and may include information elements 532, 536, and 538. Several examples of information elements 560 for use in a management frame are illustrated in FIG. 5. The information elements 560 may include a HE Operations element field 562 to indicate whether Co-Located BSS Capability is activated. A Neighbor Report element field 564 may include a BSSID and profile information for a co-located BSS. These elements are further described in FIG. 6. A reduced neighbor report (RNR) element 566 is another type field that may be used to indicated co-located or co-hosted BSSs.

Several examples of information elements 570 for use in a co-hosted BSS control frame are also illustrated in FIG. 5. The information elements 570 may include a trigger frame 572, a multi-STA block acknowledgment 574, or an NDP announcement. Each of these elements may identify STAs that are associated with more than one co-hosted BSS in a Co-Hosted BSS Set. Furthermore, a capability field (not shown) may be used to indicate support for co-hosted BSS control frame aggregation. The capability field may include one or more bits and may be included in a management frame or other communication. Either the VAP or STA (or both) may indicate capability to utilize co-hosted BSS control frame aggregation capability.

Figure 6:
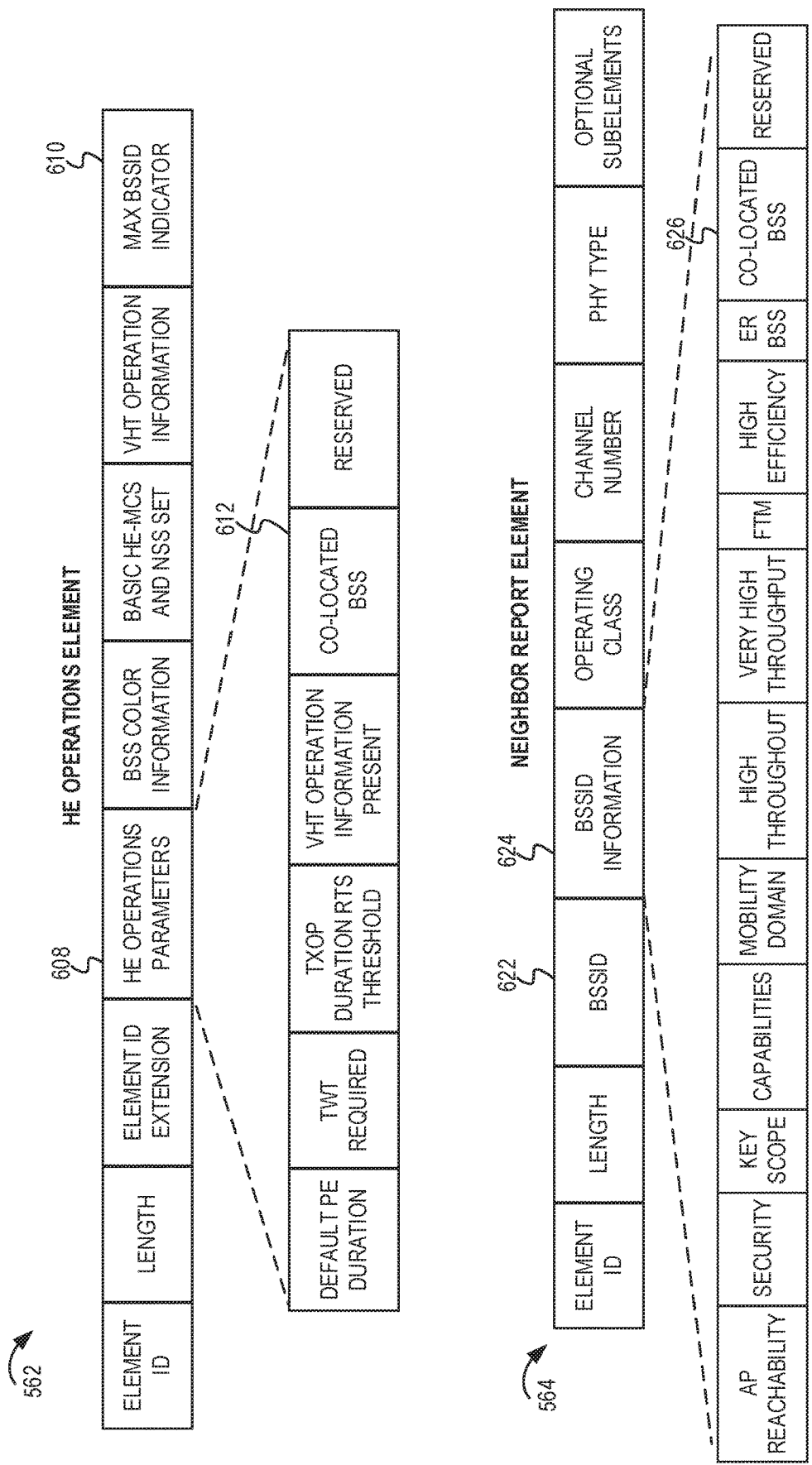
FIG. 6 depicts a conceptual diagram of an example element in a management frame that includes identifiers for co-located or co-hosted BSSs.

FIG. 6 depicts a conceptual diagram of an example elements in a management frame that includes identifiers for co-located or co-hosted BSSs. In FIG. 6, an HE Operations element 562 may include several fields, including an HE operations parameters field 608 and a Max BSSID indicator field 610. The HE operations parameters field 608 may be further broken down into subfields. A Co-Located BSS field 612 in the HE operations parameter may indicate whether the BSS that transmitted this management frame is part of a Co-Located BSS Set. In some implementations, the Co-Located BSS field 612 may be a single bit that is set or unset depending on whether the BSS is in a Co-Located BSS Set or not, respectively. The Max BSSID indicator field 610 may be used to signal contiguous BSSIDs that are part of the Co-Located BSS Set, as described in FIG. 1.

The Neighbor Report element 564 may be broken down into several subfields. For example, the Neighbor Report element 564 may include a BSSID field 622 and a BSSID Information field 624. The BSSID Information field 624 may include several fields including a Co-Located BSS Indicator 626. In accordance with this disclosure, the Co-Located BSS indicator 626 may be used to signal whether the BSSID associated with the Neighbor Report is part of a Co-Located BSS Set. In some implementations, the Co-Located BSS Indicator 626 may be a single bit.

Other ways of indicating a co-located or co-hosted BSS are possible. For example, a Co-Hosted BSS Indicator (not shown) may be used to indicate that a BSS identified in the Neighbor Report element is a co-hosted BSS. In some implementations, if the color, wireless channel, and operating class are the same (between a first BSS sending the management frame and a second BSS indicated in the Neighbor Report), then a STA may interpret the message as intending the second BSS to be treated as a co-hosted BSS. Additionally, or alternatively, a Reduced Neighbor Report (RNR) could be used to advertise a co-located or co-hosted BSS. An RNR is similar to the Neighbor Report with some redundant fields eliminated.

Various implementations of this disclosure relate generally to improvements of co-located or co-hosted BSSs. Some implementations more specifically relate to the use of management frames to provide some information regarding co-located or co-hosted BSSs. Absent the techniques in this disclosure, the STAs that are associated to one of the BSSs may not know what other BSSs are co-located or co-hosted at the same WLAN apparatus. As described above co-hosted BSSs may share a same operating class, color, channel, and one or more antennas. Thus, wireless transmissions for the co-hosted BSSs may appear similar to a STA, except for the BSSID and other BSS parameters (such as security, SSID, etc.). By informing the STA regarding the co-hosted BSSs, the operation of the WLAN may be improved. For example, the STA may update its receiver and transmitter settings to avoid or monitor colliding or overlapping transmissions for a co-hosted BSS. Furthermore, one co-hosted BSS may transmit control frames that include control information regarding another co-hosted BSS.

Particular implementations of the subject matter described in this disclosure can be implemented to realize one or more of the following potential advantages. A WLAN apparatus can inform a STA regarding co-located or co-hosted BSSs. This may improve service for co-located or co-hosted BSSs as well as the STA. A STA can reduce power consumption by implementing power-saving measures such as sleeping during times when the wireless communication medium is in use by a co-located or co-hosted BSS. Additionally, collision avoidance and airtime utilization can be improved when the WLAN apparatus informs the STA regarding co-located or co-hosted BSSs.

FIG. 7 depicts a flowchart with an example process 700 for signaling identifiers for co-located or co-hosed BSSs. In some implementations, the process 700 may be performed by a WLAN apparatus, such as the WLAN apparatus 150 (or an apparatus implementing AP 200 or VAPs 151, 152, 153, 154, 410, or 411) as described above with reference to FIGS. 1, 2, and 4, respectively. In some implementations, the process 700 begins in block 710. In block 710, a WLAN apparatus may operate multiple VAPs associated with corresponding co-located BSSs. The multiple VAPs may include at least a first VAP for a first BSS and a second VAP for a second BSS. The first VAP and the second VAP may utilize different management frames. In block 720, the WLAN apparatus may output, via the first BSS, a first management frame that includes an identification of the second BSS.

In some implementations, the first BSS and the second BSS may share a same operating class, channel, and one or more antennas of the WLAN apparatus such that the first BSS and the second BSS are co-hosted BSSs in a Co-Hosted BSS Set.

In some implementations, the example process 700 includes the WLAN apparatus outputting a control frame from the first BSS. The control frame may include control information for the second BSS. For example, the control frame may include a trigger frame, trigger instructions, or other control information intended for a STA that is associated with the second BSS.

FIG. 8 depicts a flowchart with an example process 800 for a station (STA) receiving a management frame that includes identifiers for co-located BSSs. In some implementations, the process 800 may be performed by a STA, such as the STAs 110, 120, 130, 140, 300, or 420, as described above with reference to FIGS. 1, 2, and 34, respectively. In some implementations, the process 800 begins in block 810. In block 810, the STA may receive, from a first VAP associated with a first BSS, a first management frame that includes an identification of a second BSS. In block 820, the STA may determine that the WLAN apparatus is operating multiple VAPs associated with corresponding co-located BSSs. The multiple VAPs may include at least the first VAP associated with the first BSS and a second VAP associated with a second BSS. The first VAP and the second VAP may utilize different management frames because they manage co-located or co-hosted BSSs.

In some implementations, the first BSS and the second BSS share a same operating class, channel, and one or more antennas of the WLAN apparatus such that the first BSS and the second BSS are co-hosted BSSs in a Co-Hosted BSS Set.

In some implementations, the STA may establish a wireless association with the second VAP and join the second BSS. The STA may determine that the first BSS is a master BSS for the Co-Hosted BSS Set that includes the second BSS. For example, a management frame (such as a beacon frame, probe response frame, or association frame) from the second BSS may indicate that the first BSS is co-hosted BSS in a Co-Hosted BSS Set that includes the second BSS. The management frame may indicate that the first BSS is a master BSS for the Co-Hosted BSS Set. While maintaining the wireless association with the second VAP, the STA may receive a control frame from the first VAP corresponding to the first BSS. The control frame may include control information for the STA.

Figure 9:
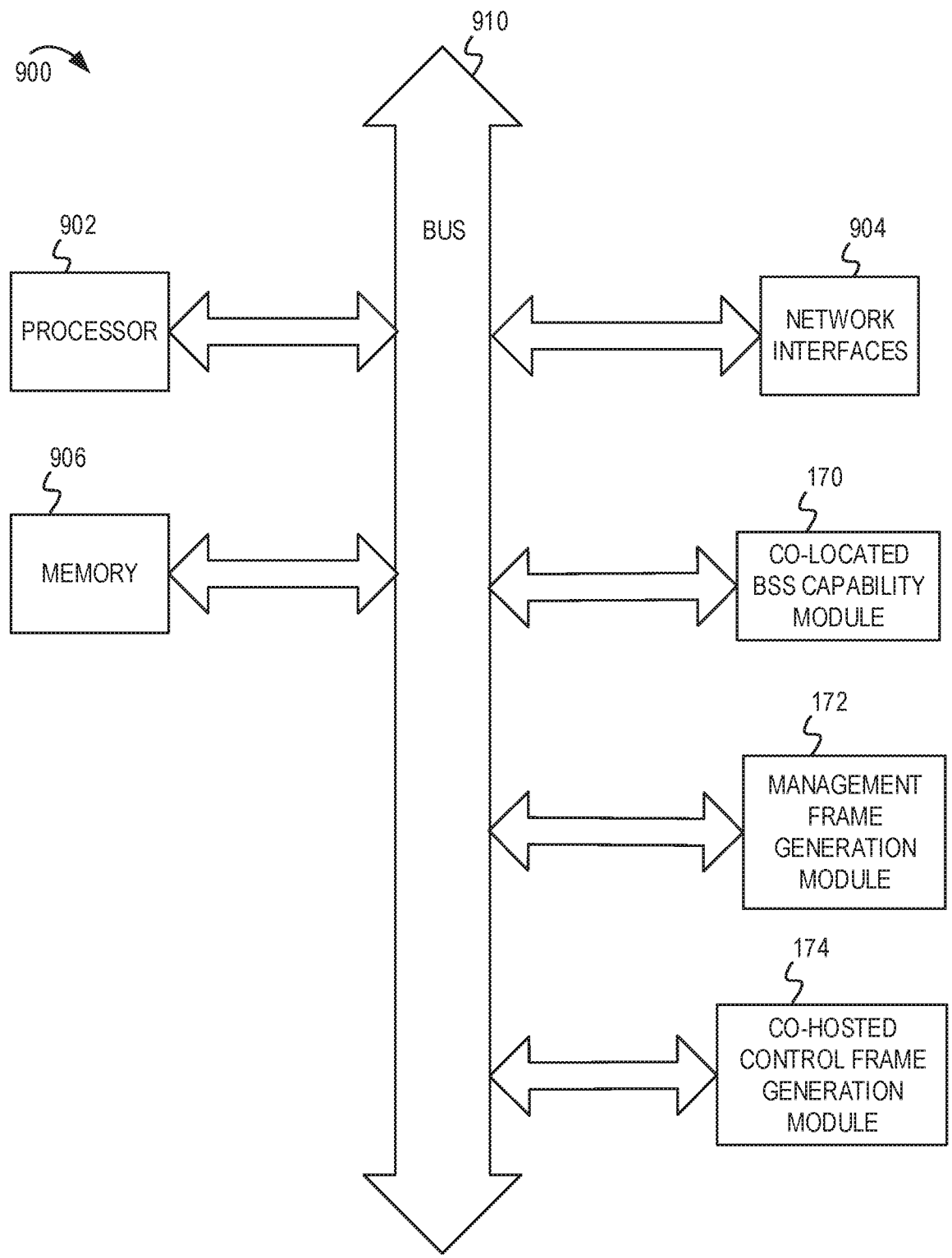
FIG. 9 shows a block diagram of an example electronic device for implementing aspects of this disclosure.

FIG. 9 shows a block diagram of an example electronic device for implementing aspects of this disclosure. In some implementations, the electronic device 900 may be one of an access point (including any of the APs described herein), a range extender, or other electronic systems. The electronic device 900 can include a processor unit 902 (possibly including multiple processors, multiple cores, multiple nodes, or implementing multi-threading, etc.). The electronic device 900 also can include a memory unit 908. The memory unit 906 may be system memory or any one or more of the possible realizations of computer-readable media described herein. The electronic device 900 also can include a bus 910 (such as PCI, ISA, PCI-Express, HyperTransport®, InfiniBand®, NuBus,® AHB, AXI, etc.), and a network interface 904 that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 900 may support multiple network interfaces—each of which is configured to couple the electronic device 900 to a different communication network.

The electronic device 900 may include a Co-Located BSS Capability module 170, a management frame generation module 172, and a Co-Hosted Control Frame Generation module 174, similar to those described in FIG. 1. In some implementations, the Co-Located BSS Capability module 170, the management frame generation module 172, and the Co-Hosted Control Frame Generation module 174 can be distributed within the processor unit 902, the memory unit 906, and the bus 910.

The memory unit 906 can include computer instructions executable by the processor unit 902 to implement the functionality of the implementations described in FIGS. 1-8.

Any one of these functionalities may be partially (or entirely) implemented in hardware or on the processor unit 902. For example, the functionality may be implemented with an application specific integrated circuit, in logic implemented in the processor unit 902, in a co-processor on a peripheral device or card, etc. Further, realizations may include fewer or additional components not illustrated in FIG. 9 (such as video cards, audio cards, additional network interfaces, peripheral devices, etc.). The processor unit 902, the memory unit 906, and the network interface 904 are coupled to the bus 910. Although illustrated as being coupled to the bus 910, the memory unit 906 may be coupled to the processor unit 902.

FIGS. 1-9 and the operations described herein are examples meant to aid in understanding example implementations and should not be used to limit the potential implementations or limit the scope of the claims. Some implementations may perform additional operations, fewer operations, operations in parallel or in a different order, and some operations differently.

While the aspects of the disclosure have been described in terms of various examples with their associated operations, a person skilled in the art would appreciate that a combination of operations from any number of different examples is also within the scope of the aspects of the disclosure.

As used herein, a phrase referring to "at least one of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication by an access point (AP) apparatus, comprising:
operating multiple virtual access points (VAPs) including at least a first VAP associated with a first basic service set (BSS) and a second VAP associated with a second BSS, each of the first VAP and the second VAP being configured to transmit independent respective Beacon frames such that the first BSS and the second BSS are not in a Multiple basic service set identifier (BSSID) Set; and
transmitting a Beacon frame from the first VAP, the Beacon frame carrying a high efficiency (HE) operation element including one or more bits indicating that the first VAP shares a same operating class, a same channel and one or more same antennas as the second VAP such that the first BSS and the second BSS are co-hosted in the AP apparatus.

2. The method of claim 1, further comprising;
signaling, in a MaxBSSID indicator field of the HE operation element, a maximum quantity of BSSIDs belonging to a Co-Hosted BSS Set that includes the first BSS and the second BSS.

3. The method of claim 2, wherein the MaxBSSID indicator field carries a value n that indicates up to $2^n$ BSSIDs belong to the Co-Hosted BSS Set.

4. The method of claim 3, wherein 48-n most significant bits of the $2^n$ BSSIDs are common to all BSSs in the Co-Hosted BSS Set.

5. An access point (AP) apparatus for wireless communication, comprising:
at least one processor configured to operate multiple virtual access points (VAPs) including at least a first VAP associated with a first basic service set (BSS) and a second VAP associated with a second BSS, each of the first VAP and the second VAP being configured to generate independent respective Beacon frames such that the first BSS and the second BSS are not in a Multiple basic service set identifier (BSSID) Set; and
at least one modem communicatively coupled to at least one processor and configured to output a Beacon frame for transmission from the first VAP, the Beacon frame carrying a high efficiency (HE) operation element including one or more bits indicating that the first VAP shares a same operating class, a same channel and one or more same antennas as the second VAP such that the first BSS and the second BSS are co-hosted in the AP.

6. The AP apparatus of claim 5, wherein the HE operation element includes a MaxBSSID indicator field that signals a maximum quantity of BSSIDs belonging to a Co-Hosted BSS Set that includes the first BSS and the second BSS.

7. The AP apparatus of claim 6, wherein the MaxBSSID indicator field carries a value n that indicates up to $2^n$ BSSIDs belong to the Co-Hosted BSS Set.

8. The AP apparatus of claim 7, wherein 48-n most significant bits of the $2^n$ BSSIDs are common to all BSSs in the Co-Hosted BSS Set.

* * * * *